Oct. 5, 1954 P. L. WELKER 2,690,850
PROCESS FOR UNLOADING CONTAINERS
Filed Feb. 18, 1950
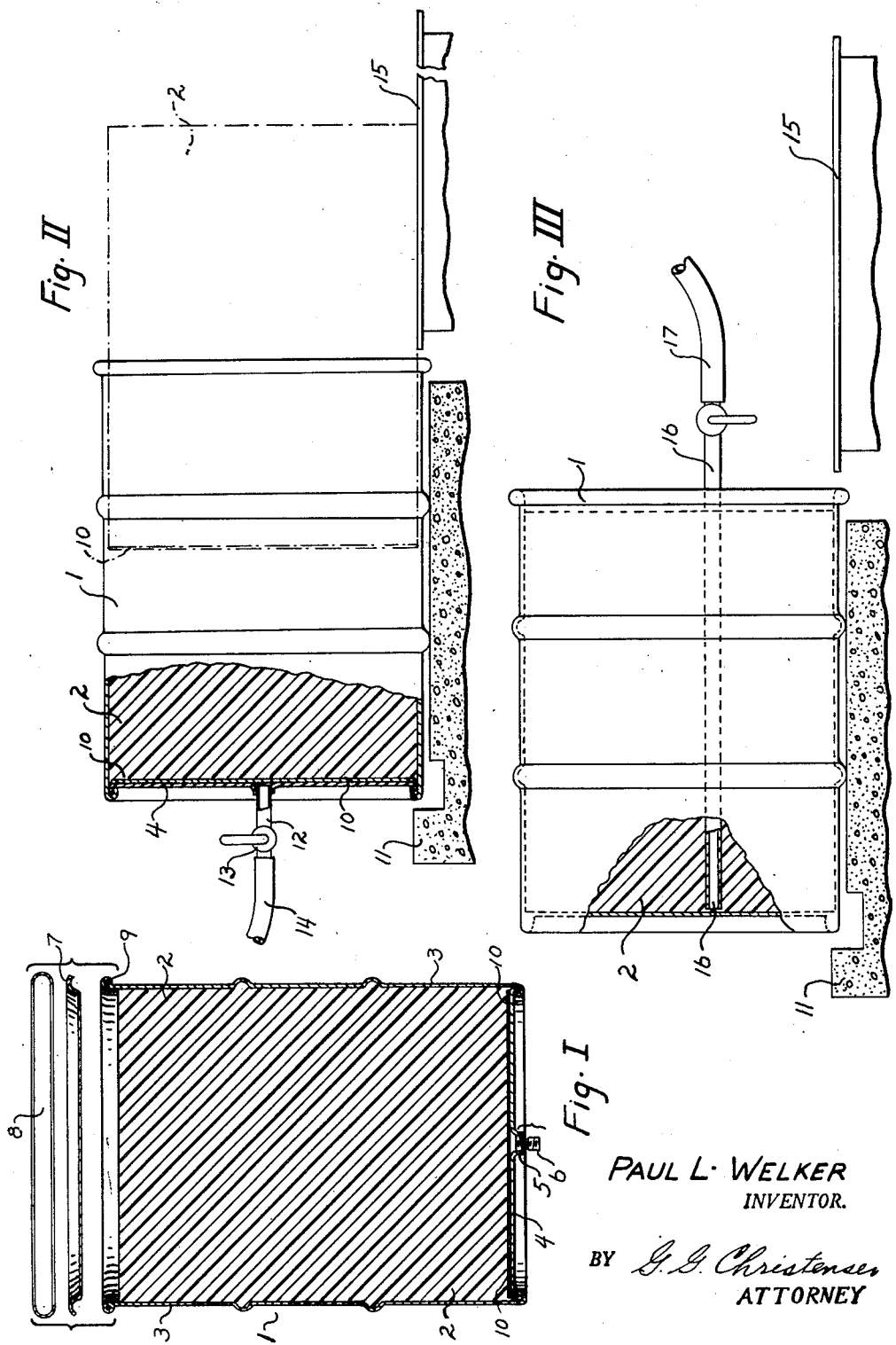
PAUL L. WELKER
INVENTOR.
BY G. G. Christensen
ATTORNEY Patented Oct. 5, 1954

2,690,850

UNITED STATES PATENT OFFICE 2,690,850

PROCESS FOR UNLOADING CONTAINERS

Paul L. Welker, New York, N. Y., assignor to The Glidden Company, Cleveland, Ohio, a corporation of Ohio Application February 18, 1950, Serial No. 144,920

1 Claim. (Cl. 214—152)

This invention relates to a process and apparatus for removing plasticized shortening and similar plastic edible fats from removable-end shipping drums.

Large suppliers and users of plasticized shortening, lard, hard butter, cocoa butter, etc., such as bakeries and confectioners, prefer to have the shortening or edible fat packed in rather large drums which can be refilled after being emptied. It is customary to use metal drums which have one end completely removable. Heretofore such drums of shortening, for example, have been emptied either by shoveling the shortening out by hand, or by heating the drum and shortening until the latter is fluid, and then pouring the shortening from the drum. The melting technique is expensive, time-consuming and detrimental to the shortening, however, while the shoveling technique involves considerable expense in labor, and is apt to be unsanitary.

I have now found, however, that the shortening or other edible fat can be readily removed from the drum in a unitary cylindrical mass by admitting compressed air or other gas between the closed end of the drum and the bottom end of the mass of shortening. By so expelling the edible fat en masse from the drum, the operation of emptying the drum is completed in less than a minute generally, while the material remains in a self-sustaining mass which may be conveniently transferred in a sanitary manner to weighing, mixing and processing equipment. To accomplish these ends, I have provided a shipping drum which is particularly adapted for the purpose.

Accordingly it is an object of this invention to provide novel processes for unloading shortening and similar plastic edible fats from shipping drums which have a removable end.

It is another object to provide a novel article of manufacture in the form of a shipping drum adapted for shortening and plastic edible fats and characterized by having one end thereof completely removable, and having a gas inlet in the other end.

It is a further object to provide a novel container having the aforementioned features of construction, said container being filled with plasticized shortening or other plastic edible fats.

These and other objects will be apparent from the following description of the invention taken in conjunction with the attached figure of drawings in which:

Figure I is an exploded sectional elevational view of a shipping drum embodying the principles of my invention and filled with plasticized shortening;

Figure II is an elevational view of the filled drum of Figure I on its side in a position convenient for emptying it, the removable end of the drum and the air inlet having been removed, and a valved supply of compressed air having been connected to the inlet. A portion has been broken away to better illustrate certain features;

Figure III is an elevational view partly in section of a drum filled with shortening, and showing a different embodiment of the invention in which a compressed air supply tube is shown in position in the shortening in readiness for emptying the drum.

Referring now to Figure I, a shipping drum 1 is shown filled with shortening 2, the drum being fabricated of suitable materials, preferably metal, and having a substantially tubular body section 3 closed at the bottom by an end wall 4 having an internally-threaded inlet 5 and a threaded inlet plug 6 therein, and closed at the top by an end wall or lid 7 removably secured to the body section by means of a clamping ring 8 of approximately semi-circular cross-section and which conforms closely to the shape of the rolled end flange 9 of the drum when the lid is in place thereon. The clamping ring is tightened by means of an over-center toggle not shown and by the same toggle means can be expanded in diameter sufficiently to allow it to be placed in position on the drum. This type of clamping ring and lid construction is well known in the art, forms no part of this invention and is therefore not illustrated in detail. Any other type of drum may be used which has one end or a lid removable from the body of the drum so as to leave the container completely open. A disc of waxed paper 10 or the like reposes between the bottom end of the shortening and the bottom end wall of the container.

Figure II shows the drum 1 of shortening on its side in a convenient position on a suitable support 11 for emptying the shortening from it. The clamping ring 8 and lid 7 of Figure I have been removed from the drum so as to expose the entire surface of the shortening. The plug 6 of inlet 5 in the bottom end of the drum has been removed and has been replaced with a nipple 12 to which is connected a valve 13, and a compressed air line 14. The valve is shown in a closed position. When the valve is opened slightly, air under pressure is introduced into the drum between the end wall 4 and the disc of wax paper 10.

As additional compressed air is allowed to enter the drum, pressure is gradually built up to a point where the mass of shortening 2, acting like a piston, is gradually displaced to the right, as shown by the broken lines. It will be understood that as additional compressed air is thereafter admitted to the drum, the entire mass of shortening may be displaced to the right until it is substantially free from contact with the drum. Developed pressures of between about 10 and 15 pounds are usually effective for this purpose in the case of plasticized shortening, but with other shortenings, lards, and edible fats, pressures ranging from ½ lb. to 50 lbs. or more may be used. The container should be composed and constructed of materials which render it substantially completely resistant to deformation by internal fluid pressures of the magnitude which is required, as one object of the invention is to retain the drum in suitable condition for re-use where circumstances, laws and regulations so permit. A receiving table 15 is shown disposed beneath the drum and to the right thereof in a position to receive the mass. It will be understood that the disc 10 of wax paper serves as a follower for the mass of shortening, preventing the compressed air from finding an outlet through the mass of shortening and thereby assisting complete expulsion of the shortening en masse.

Figure III illustrates a different mode of applying the principles of my invention. In accordance with this mode of practice, a tube 16 of metal or other suitable material is forced into the mass of plastic edible fat from the exposed end thereof until it reaches the bottom of the drum. The tube is connected to a valved supply of compressed air 17. After the tube has been inserted to the bottom of the drum, compressed air is admitted through it to gradually build up fluid pressure between the bottom of the drum and the bottom of the plastic material sufficient to force the material from the drum. It will be understood that the tube moves outwardly with the emerging material. This mode is especially useful when the shipping container is not provided with an aperture in its bottom wall through which compressed air may be admitted in the manner illustrated in Figure II.

It will be apparent that my invention makes it possible to empty a drum of plastic edible fat quickly, easily and in a sanitary manner. Moreover, it avoids the former laborious shoveling method and the harmful and expensive melting method, and hence constitutes an improvement in handling methods for such commodities. Moreover, the equipment involved in practicing the invention is relatively inexpensive when a supply of compressed air is available, as is common in most large processing plants.

In my preceding description of the invention, I have designated compressed air as the elastic fluid employed in practicing the invention. It will, of course, be apparent that various other relatively inert gases could be used instead, such as carbon dioxide or nitrogen. Compressed air is cheapest and most practical, however. Various modifications will be apparent to those skilled in this art.

Having described my invention, what I claim is:

The method of emptying an elongated shipping container having parallel side walls and which is completely open at its top end, closed at its bottom end, and substantially filled with plastic fatty material, said method comprising the steps of: disposing said filled container on its side with its open end adjacent a rigid table-like surface capable of receiving and supporting the said plastic fatty material when discharged from said container; inserting the discharge end of an elongated conduit into said plastic material from the open end of the container until said discharge end contacts the bottom end of said container at about its center, thereafter admitting inert elastic fluid under pressure through said conduit to build up elastic fluid pressure between the end of said container and the bottom of said plastic fatty material, and continuing to admit elastic fluid under pressure until fluid pressure has been developed within said container sufficient to cause the plastic material and the conduit disposed therein to move en masse substantially as a piston toward and out of the open end of said container and on to said rigid receiving and supporting surface.

References Cited in the file of this patent

UNITED STATES PATENTS

| Number | Name | Date |
|---|---|---|
| 1,425,337 | Priskey | Aug. 8, 1922 |
| 1,518,238 | Abbott | Dec. 9, 1924 |
| 1,664,667 | Davis | Apr. 3, 1928 |
| 2,259,383 | Kutz | Oct. 14, 1941 |
| 2,343,154 | Morgan et al. | Feb. 29, 1944 |
| 2,455,764 | Hartlove | Dec. 7, 1948 |
| 2,506,204 | Freestone | May 2, 1950 |
| 2,570,070 | Palmer | Oct. 2, 1951 |